(12) United States Patent
Lee

(10) Patent No.: US 7,860,745 B2
(45) Date of Patent: Dec. 28, 2010

(54) CREDIT CARD SIGNATURE INSPECTION SYSTEM AND METHOD CAPABLE OF ENHANCING SECURITY FOR TRANSACTION

(76) Inventor: Ronald Lee, 4F., No. 6, Lane 15, Jian-an St., Sindian City, Taipei County (TW) 231

( * ) Notice: Subject to any disclaimer, the term of this patent is extended or adjusted under 35 U.S.C. 154(b) by 25 days.

(21) Appl. No.: 12/379,134

(22) Filed: Feb. 13, 2009

(65) Prior Publication Data
US 2009/0313130 A1  Dec. 17, 2009

(30) Foreign Application Priority Data
Jun. 11, 2008  (TW) ............................... 97121671 A

(51) Int. Cl.
*G06Q 20/00*  (2006.01)
(52) U.S. Cl. ..................... 705/17; 705/18; 705/64; 705/75
(58) Field of Classification Search .................. None
See application file for complete search history.

(56) References Cited

U.S. PATENT DOCUMENTS

| | | | |
|---|---|---|---|
| 5,150,420 A * | 9/1992 | Haraguchi ................. 382/119 |
| 6,615,194 B1 * | 9/2003 | Deutsch et al. ............. 705/75 |
| 6,694,045 B2 * | 2/2004 | Chung et al. ............... 382/119 |
| 7,080,037 B2 * | 7/2006 | Burger et al. ................ 705/50 |
| 7,461,779 B2 * | 12/2008 | Ramachandran ........... 235/379 |
| 2003/0132292 A1 * | 7/2003 | Gomez et al. ............... 235/383 |
| 2004/0015688 A1 * | 1/2004 | Yu Zhang et al. ........... 713/155 |
| 2006/0178936 A1 * | 8/2006 | Boxer et al. .................. 705/18 |
| 2007/0028107 A1 * | 2/2007 | Cowburn et al. ............ 713/172 |
| 2007/0198432 A1 * | 8/2007 | Pitroda et al. ............... 705/64 |
| 2009/0132813 A1 * | 5/2009 | Schibuk ...................... 713/158 |

\* cited by examiner

*Primary Examiner*—F. Ryan Zeender
*Assistant Examiner*—Fateh M Obaid
(74) *Attorney, Agent, or Firm*—Bacon & Thomas, PLLC

(57) ABSTRACT

A credit card signature inspection system includes a card-sliding device and a credit card server. The card-sliding device produces a signature authentication request including credit card data and produces a bill to be signed. The credit card server includes a credit card database pre-stored with data of credit cards. Data of each credit card corresponds to an authentication signature of a credit card holder. The credit card server receives the signature authentication request and searches the credit card database based on the credit card data in the signature authentication request to produce an authentication signature corresponding to the credit card data. The authentication signature is transferred to the card-sliding device and displayed on the card-sliding device to check whether the authentication signature on the card-sliding device corresponds to the signature of the consumer for the bill, so as to determine whether to approve the proceeding of the transaction.

11 Claims, 3 Drawing Sheets

CREDIT CARD SIGNATURE INSPECTION SYSTEM AND METHOD CAPABLE OF ENHANCING SECURITY FOR TRANSACTION

BACKGROUND OF THE INVENTION

1. Field of the Invention

The invention relates to a credit card signature inspection system and method capable of enhancing security for transaction and, more particularly, to a system and method for inspecting a credit card signature to enhance security for transaction by checking whether an authentication signature corresponds to a consumer's signature.

2. Description of Related Art

Recently, since the use of a credit card is becoming more popular and convenient and the holding rate thereof is increasing, counterfeiting card and stealthily sliding card happen again and again, rendering panic of the people and influence on the social order seriously. In addition, the skill to commit crime is progressed from a small quantity of counterfeiting card and stealthily sliding card to a huge quantity of stealthily recording and counterfeiting by using chips, and the counterfeit cards are sold to non-particular persons for card-sliding, while it is almost unable to fortify the crimes in time and place.

The back side of a credit card is provided with a signature of the card holder. As a transaction is proceeded using a credit card, the consumer has to sign his/her name for a bill and the clerk checks whether the signed name is coincident with the signature on the back side of the credit card to determine whether to proceed with the transaction. However, since the clerk is not an expert on discriminating one's handwriting, the judging ability for the handwriting is quite limited. Therefore, it is easy for a criminal to stealthily sliding the credit card once he/she picks up or steals the card and then imitates the signature. Moreover, if the criminal uses a counterfeited credit card, it is easier to proceed with the card-sliding because the signature of the counterfeited credit card is imitated.

Hence, to prevent from flourishing of transactions for card-sliding stealthily, it is a need to decrease the probability of smooth intrusion by a person to stealthily slide the card. As time goes, when the person of stealthily sliding the card finds difficulty, the person using a counterfeited card will be decreased naturally. The problem of counterfeiting or stealthily sliding the card can be overcome.

SUMMARY OF THE INVENTION

The invention is mainly intended to provide a credit card signature inspection system and method capable of enhancing security for transaction and avoiding loss caused by the credit card being stealthily slid.

According to a feature of the invention, there is provided a credit card signature inspection system capable of enhancing security for transaction, which comprises a card-sliding device and a credit-card server, in which the card-sliding device is provided for a credit card to proceed with a transaction thereon, produces a signature authentication request including credit card data, and produces a bill to be signed by a consumer thereon. The credit card server includes a credit card database pre-stored with data of a plurality of credit cards, data of each credit card corresponds to an authentication signature of a credit card holder. The credit card server is used for receiving the signature authentication request and searching the credit card database based on the credit card data in the signature authentication request to produce an authentication signature corresponding to the credit card data, the authentication signature is transferred to the card-sliding device, and the authentication signature is displayed on the card-sliding device to check whether the authentication signature on the card-sliding device corresponds to the signature of the consumer for the bill, so as to determine whether to approve the proceeding of the transaction.

According to another feature of the invention, there is provided a credit card signature inspection method capable of enhancing security for transaction, in which a credit card may be slid and read at a card-sliding device for proceeding with a transaction, the card-sliding device is connected to a credit card server through a network, the credit card server includes a credit card database pre-stored with data of a plurality of credit cards, and data of each credit card corresponds to an authentication signature of a credit card holder. The method comprises the following steps: sliding and reading the credit card at the card-sliding device to produce a bill for signature by a consumer and to produce a signature authentication request, including the credit card data, and transferring the signature authentication request to the credit card server; searching the credit card database by the credit card server based on the credit card data in the signature authentication request to produce the authentication signature corresponding to the credit card data, and transferring the authentication signature to the card-sliding device; displaying the authentication signature on the card-sliding device to check whether the authentication signature on the card-sliding device corresponds to the signature of the consumer for the bill; and approving the proceeding of the transaction and continuing a subsequent transaction activity if the authentication signature on the card-sliding device corresponds to the signature of the consumer for the bill, if not, rejecting the proceeding of the transaction.

DETAILED DESCRIPTION OF THE INVENTION

Figure 1A:
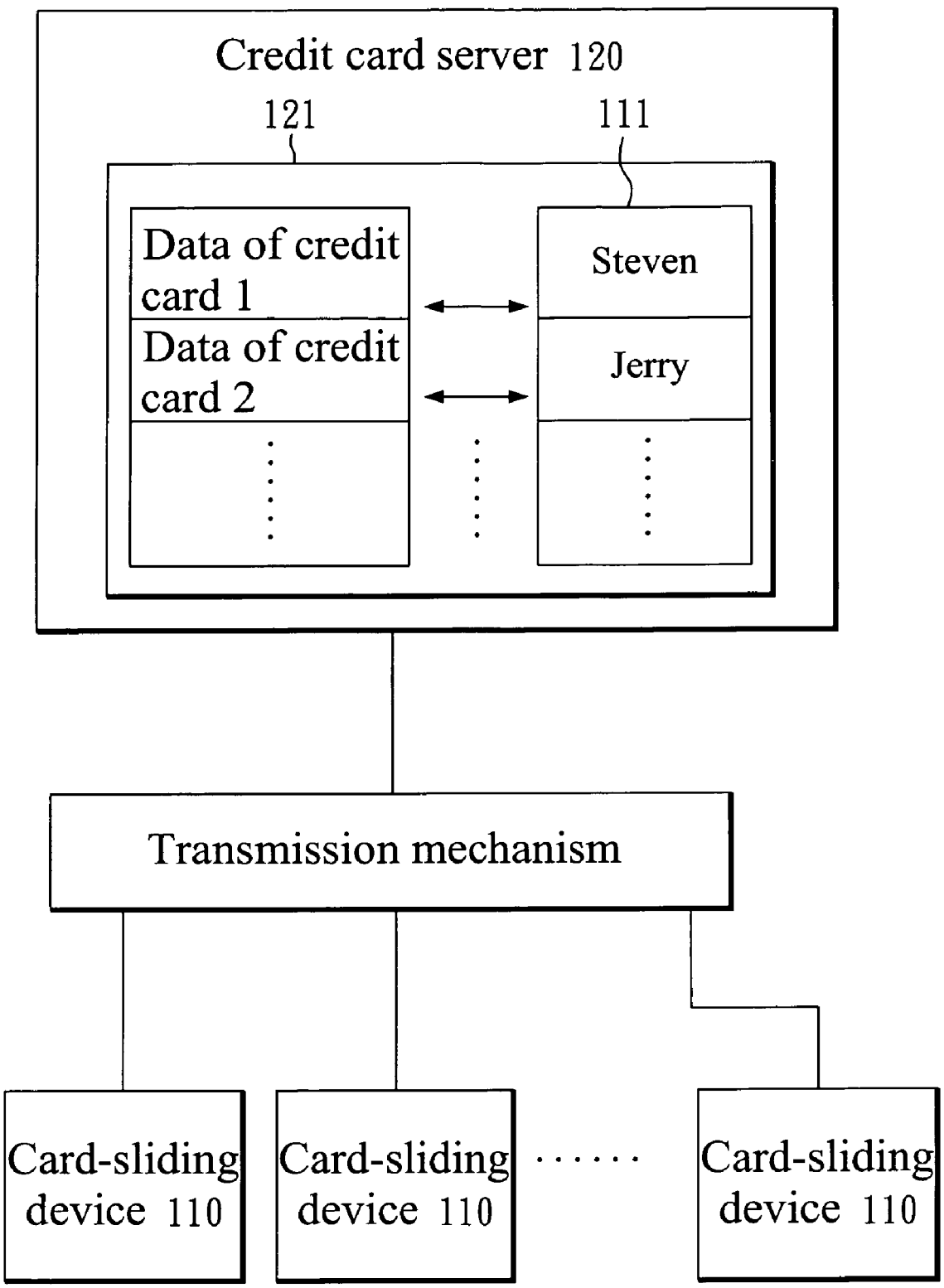
FIG. 1A is a schematic diagram showing a credit card signature inspection system capable of enhancing security for transaction according to a preferred embodiment of the invention.

FIG. 1A is a schematic diagram showing a credit card signature inspection system capable of enhancing security for transaction. As shown in FIG. 1A, the system of the invention comprises: a card-sliding device 110 and a credit card server 120. The credit card server 120 includes a credit card database 121 pre-stored with data of a plurality of credit cards. The credit card data includes personal credit data and personal data of a credit card holder. Data of each credit card corresponds to an authentication signature 111 of the credit card holder. The signature authentication request is transferred from the card-sliding device 110 to the credit card server 120 via a transmission mechanism, and the transferring mechanism can be a wired connection, wireless connection or network connection. The card-sliding device 110 is a card reader or a computer equipment installed in a business firm.

Figure 1B:
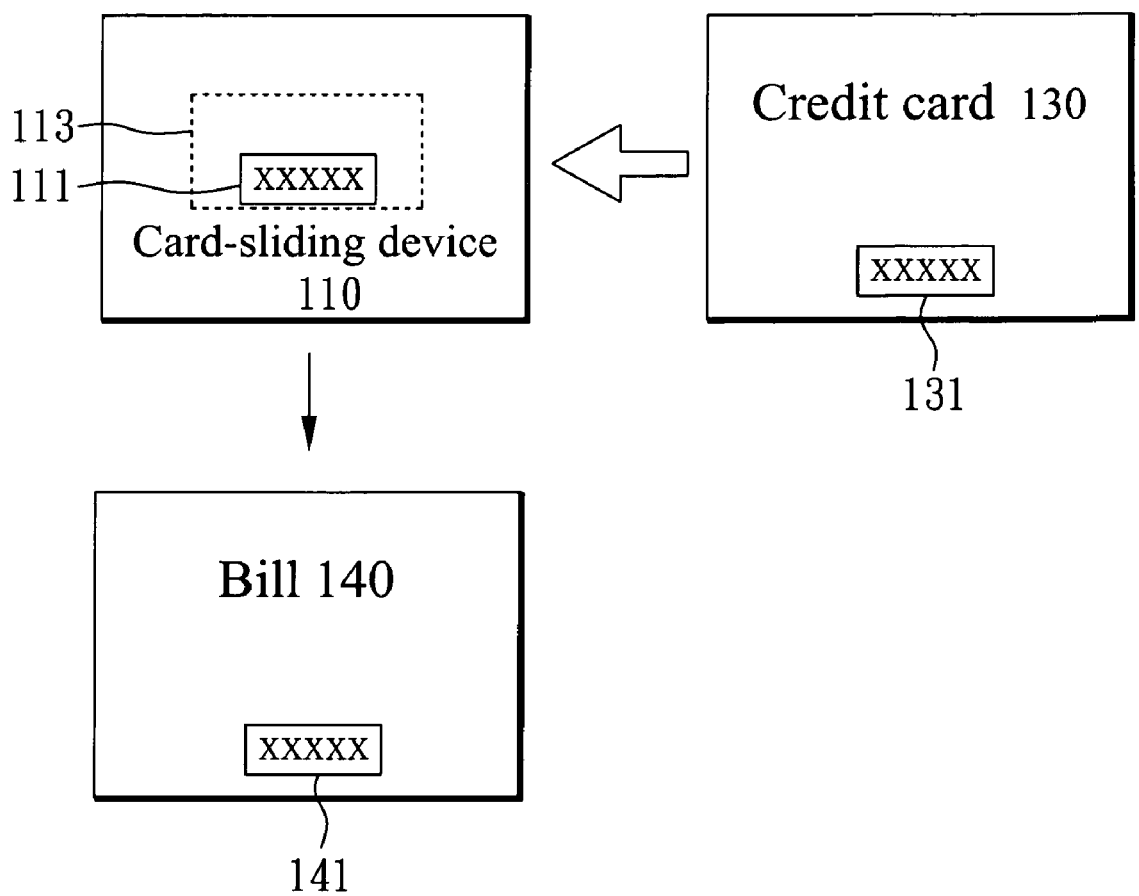
FIG. 1B is a schematic diagram showing the sliding of a credit card at a card-sliding device to produce a bill.
Figure 2:
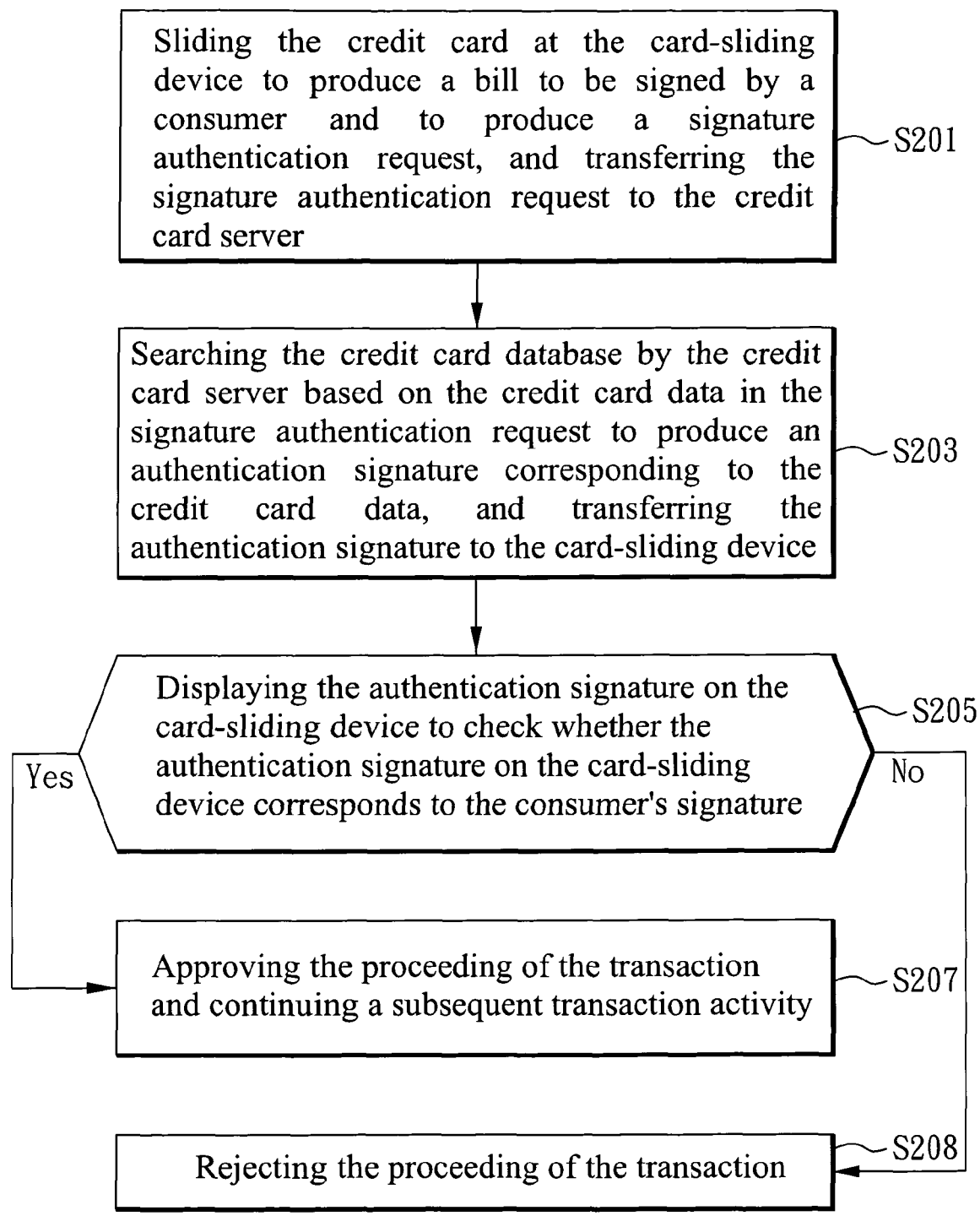
FIG. 2 is a flow chart showing a credit card signature inspection method capable of enhancing security for transaction according to a preferred embodiment of the invention.

FIG. 1B is a schematic diagram showing the sliding of a credit card at a card-sliding device to produce a bill. FIG. 2 is a flow chart showing a credit card signature inspection method capable of enhancing security for transaction according to a preferred embodiment of the invention. With reference to FIG. 2 together with FIG. 1B, the method of the invention, in which a credit card 130 is slid and read slid at a card-sliding device 110 for proceeding with a transaction, as generally practiced in using a credit card 130, on which a signature for verification 131 is signed by the card holder, and the card-sliding device 110 is connected to a credit card server 120 through a network, comprises the following steps: sliding the credit card 130 at the card-sliding device 110 by the user to produce a bill 140 to be signed by a consumer, i.e. a consumer's signature 141, and to produce a signature authentication request, including credit card data, and transferring the signature authentication request to the credit card server 120 (step 201); searching the credit card database 121 by the credit card server 120 based on the credit card data in the signature authentication request to produce an authentication signature 111 corresponding to the credit card data, and transferring the authentication signature to the card-sliding device 110 (step 203); displaying the authentication signature 111 on the card-sliding device 110 to check whether the authentication signature 111 on the card-sliding device 110 corresponds to the consumer's signature 141 for the bill 140 (step 205); and approving the proceeding of the transaction and continuing a subsequent transaction activity if the authentication signature 111 on the card-sliding device 110 corresponds to the consumer's signature 141 for the bill 140 (step 207), and rejecting the proceeding of the transaction if the authentication signature 111 on the card-sliding device 110 does not correspond to the consumer's signature 141 for the bill 140 (208).

In step 203, the authentication signature 111 is chosen as one of a symbol, digit, character, effective symbol or specific graph, such as a name of the card holder plus a digit or symbol, a name of not a card holder, or a graph specifically drafted, while the authentication signature 111 corresponding to the credit card 130 is different from the signature for verification 131 actually signed on the credit card 130, thereby preventing the signature for verification 131 on the credit card 130 from being counterfeited to render the credit card 130 being stealthily slid. That is, the signature (the signature for verification 131) actually seen on the credit card 130 is completely different from the signature (the authentication signature 111) in the credit card database 121 of the credit card server 120. For example, if a credit card holder, Andy Lee, has the signature for verification 131, Andy Lee, on his credit card, while the authentication signature 111 in the credit card database 121 of the credit card server 120 is "Jerry Lee", a person who picks up or steals the card will not recognize from the credit card that the authentication signature 111 in the credit card database 121 is "Jerry Lee" as the credit card is missing or stolen, thereby effectively preventing the card from being stealthily sliding. The card-sliding device 110 includes a display screen 113 for displaying the authentication signature 111. The bill 140 is a paper printed by the card-sliding device 110 or may be directly displayed on the screen 113 of the card-sliding device 110. The consumer may sign his name on the bill displayed on the screen 113 directly.

In view of the foregoing, it is known that, in the credit card signature inspection system and method capable of enhancing security for transaction of the invention, it is that the consumer's signature 141 for the bill 140 is compared with the authentication signature 111 displayed on the screen 113 of the card-sliding device 110, but not that the consumer's signature 141 for the bill 140 is compared with the signature for verification 131 on the credit card 130. Due to that the non card-holder is not aware in advance of the authentication signature of the card holder in the credit card database 121, the non card-holder cannot stealthily slide the card by way of imitating the signature for verification 131 on the credit card 130, while side-recording can be avoided as well, thereby effectively enhancing security for transaction and decreasing loss resulting from stealthily sliding. Moreover, since the signature for verification 131 signed on the credit card 130 is completely different from the authentication signature 111 in the credit card database 121 of the credit card server 120, it can be easily seen through by a clerk if a person steals the card and slides it in a business firm. Due to a guilty conscience by a thief, if the clerk looks once at the person who steals the card, he/she will run away immediately. Thus, it can tremendously reduce the number of the cards and times of being stealthily sliding the cards.

As such, not only it is beneficiary to the bank for issuing a credit card, but also the trouble of the credit card holder is reduced, for example, inconvenience caused by changing a new card and proving that the transaction by using the counterfeited card is not a consuming activity of his/her own. Meanwhile, the user of the credit card does not have to worry about side recording during sliding the card, such that the card-holder needn't worry about the risk of being stealthily sliding and will have no worries to use the credit card for consuming.

The above embodiments are merely submitted to interpret the invention for the sake of convenience. What is claimed by the invention should be based on the appended claims, but not limited to the above-mentioned embodiments.

What is claimed is:

1. A credit card signature inspection method capable of enhancing security for transaction, in which a credit card is slid at a card-sliding device for proceeding with a transaction, the credit card has a signature for verification signed thereon by a credit card holder, the card-sliding device includes a display screen and is connected to a credit card server through a network, the credit card server includes a credit card database pre-stored with data of a plurality of credit cards, and data of each credit card corresponds to an authentication signature of a credit card holder wherein the authentication signature does not comprise the name of the credit card holder, the method comprising the steps of:

(A) receiving a credit card by a card sliding device and retrieving credit card information from the credit card by the card credit sliding device wherein the credit card comprises a signature and the signature comprises the name of the credit card holder;

(B) generating a bill by the card sliding device in response to the receiving of the credit card and displaying the bill on the display screen of the card sliding device;

(C) receiving a signature on the bill by the card sliding device wherein the signature does not comprise the name of the credit card holder;

(D) transmitting the credit card information from the card sliding device to the card server;

(E) retrieving an authentication signature by the card server from the credit card database using the credit card information;

(F) transmitting the authentication signature to the card sliding device; and (G) displaying the authentication signature on the display screen of the card sliding device.

2. The credit card signature inspection method as claimed in claim 1, wherein in step (A), the card-sliding device is a card-sliding machine or a computer equipment.

3. The credit card signature inspection method as claimed in claim 1, wherein in step (A), the credit card information includes personal credit data and personal data of the credit card holder.

4. The credit card signature inspection method as claimed in claim 1, wherein in step (E), the authentication signature is chosen as one of a symbol, digit, character, effective symbol or specific graph.

5. A credit card signature inspection system capable of enhancing security for transaction, in which a credit card is slid at a card-sliding device for proceeding with a transaction and the credit card has a signature for verification signed thereon by a credit card holder, comprising:
a card-sliding device including a display screen arranged to be connected to a credit card server through a network, the credit card server including a credit card database pre-stored with data of a plurality of credit cards, and data of each credit card corresponding to an authentication signature of a credit card holder wherein the authentication signature does not comprise the name of the credit card holder,
wherein the card-sliding device is arranged to:
receive a credit card and retrieve credit card information from the credit card, wherein the credit card comprises a signature and the signature comprises the name of the credit card holder;
generate a bill in response to the receiving of the credit card and to display the bill on the display screen of the card sliding device;
receive a signature on the bill, wherein the signature does not comprise the name of the credit card holder;
transmit the credit card information from the card sliding device to the card server;
receive an authentication signature that has been retrieved by the card server from the credit card database of the card server using the credit card information; and
display the authentication signature on the display screen of the card sliding device.

6. The credit card signature inspection system as claimed in claim 5, wherein the signature authentication request is transferred from the card-sliding device to the credit card server via a transferring mechanism and the transferring mechanism is a wired connection, wireless connection or network connection.

7. The credit card signature inspection system as claimed in claim 5, wherein the card-sliding device is a card-sliding machine or a computer equipment.

8. The credit card signature inspection system as claimed in claim 5, wherein the credit card information includes personal credit data and personal data of the credit card holder.

9. The credit card signature inspection system as claimed in claim 5, wherein the authentication signature is chosen as one of a symbol, digit, character, effective symbol or specific graph.

10. The credit card signature inspection system as claimed in claim 5, wherein the card-sliding device is installed at a business firm.

11. The credit card signature inspection system as claimed in claim 5, wherein the bill is a paper printed by the card-sliding device.

* * * * *